(12) United States Patent
Yamamoto

(10) Patent No.: US 6,488,139 B1
(45) Date of Patent: Dec. 3, 2002

(54) DAMPER MECHANISM

(75) Inventor: Kozo Yamamoto, Daito (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/273,540

(22) Filed: Mar. 22, 1999

(30) Foreign Application Priority Data

Mar. 27, 1998 (JP) .......................................... 10-081042

(51) Int. Cl.[7] .............................................. F16D 47/02
(52) U.S. Cl. .................................. 192/213.22; 464/68
(58) Field of Search ................................ 267/154, 155, 267/136, 208, 214, 215, 273; 192/213.22, 213.2; 464/68, 66, 67

(56) References Cited

U.S. PATENT DOCUMENTS

| | | | | |
|---|---|---|---|---|
| 4,545,473 A | * | 10/1985 | Alas ........................ 192/106.2 |
| 4,729,465 A | * | 3/1988 | Reik ........................ 192/106.2 |
| 4,944,499 A | * | 7/1990 | Tojima ...................... 267/154 |
| 5,715,922 A | * | 2/1998 | Imanaka ................. 192/213.22 |
| 5,954,585 A | * | 9/1999 | Nagano et al. ............... 464/68 |

\* cited by examiner

*Primary Examiner*—Paul N. Dickson
*Assistant Examiner*—Melody M. Burch
(74) *Attorney, Agent, or Firm*—Shinjyu Global IP Counselors, LLP

(57) ABSTRACT

An input rotary member 2 and an output rotary member 3 are circumferentially and elastically coupled together via first and second damper mechanisms 4 and 5 arranged in parallel. The first damper mechanism 4 includes first springs 8. The first springs 8 are arranged between the input and output rotary members 2 and 3 for transmitting torque therebetween. Compression of the first springs 8 does not start before a torsion angle reaches a first torsion angle 1. The second damper mechanism 5 includes second springs 13 and a high hysteresis torque generating mechanism 15 arranged in series. The second springs 13 can be compressed only within a range of a torsion angle θAC smaller than the first torsion angle θ1.

12 Claims, 15 Drawing Sheets

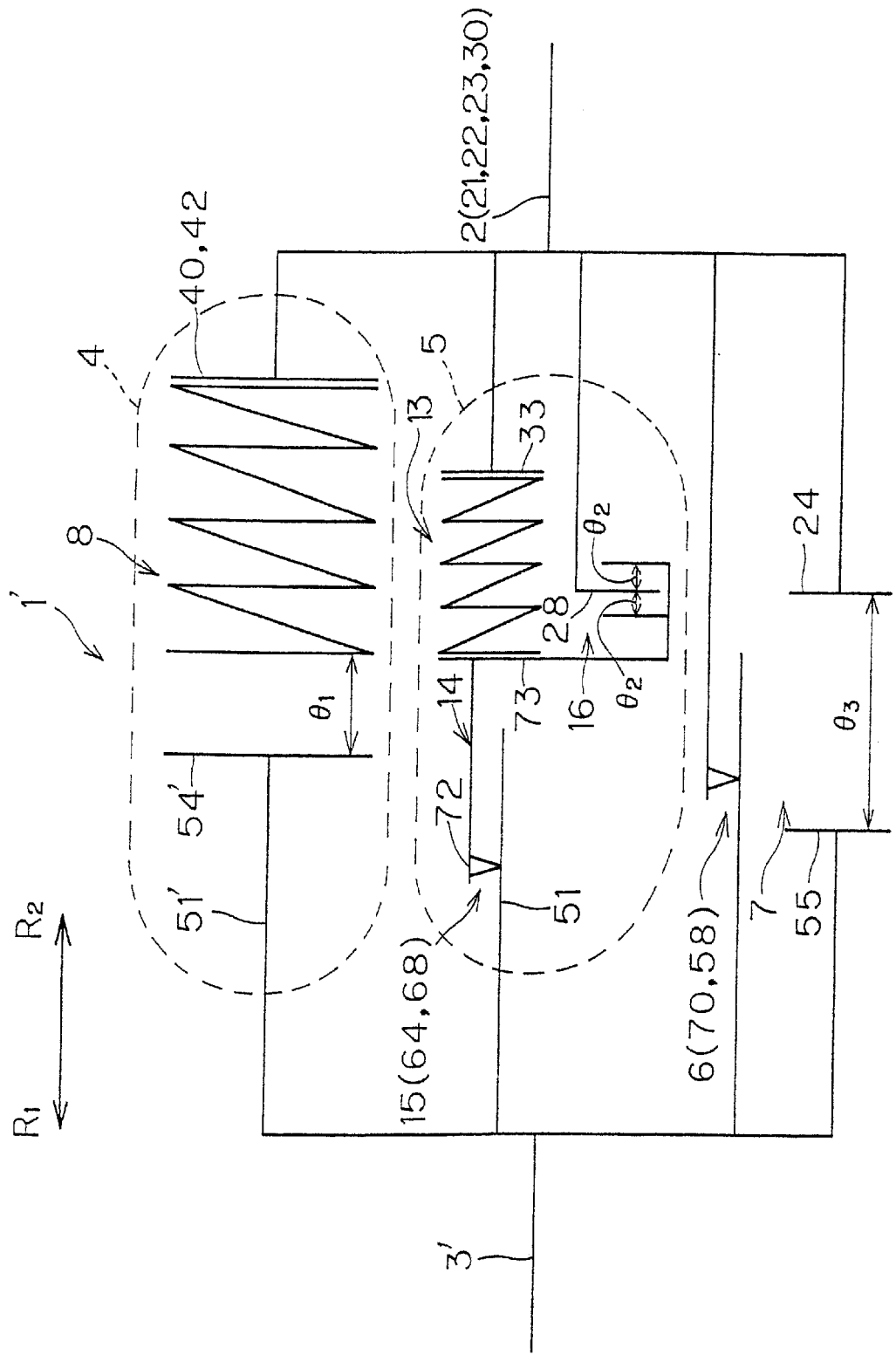

DAMPER MECHANISM

BACKGROUND OF THE INVENTION

A. Field of the Invention

The invention relates to a damper mechanism and particularly a damper mechanism for damping torsional vibrations in a power transmission system.

B. Description of the Background Art

Clutch disk assemblies used with a clutch cover assembly in vehicles are generally for the purpose of providing a means for engaging and disengaging the clutch disk assembly to and from a flywheel for transmitting torque. Such clutch disk assemblies also often include members which provide a dampening function for absorbing and damping vibrations transmitted from the flywheel. Generally, such vibrations are most noticeable as idling noises (rattle), driving noises (acceleration/deceleration rattle and muffled noises) and tip-in/tip-out (low frequency vibrations). Clutch disk assemblies having dampening capabilities are usually effective for removing these noises and vibrations.

The idling noises are rattling noises which occur from a transmission when the transmission gears are in a neutral position, e.g., during waiting at traffic signals with clutch pedal off. This rattling occurs due to the fact that an engine torque is in a low RPM engine idling range and engine combustion causes large torque variations.

The tip-in/tip-out (low frequency vibrations) are large longitudinal vibrations in the drive train of a vehicle which occur when a driver rapidly depresses or releases an accelerator. Such rapid changes in acceleration cause a correspondingly rapid response from the drive train in the vehicle, which may be characterized as a stepwise change in torque (as opposed to a gradual or smooth change in torque). When torque is transmitted stepwise to the drive train, transitional vibrations occur. As a result, torque transmitted to the wheels of the vehicle may be reflected or transmitted back from the wheels through the drive train and clutch (an oscillation of the torque). Consequently, the entire body of the vehicle may undergo some transitional vibration. Such vibrations are disturbing to the driver and passengers in the vehicle.

Dampening noises during idling is difficult where no torque is being transmitted through a clutch disk assembly because low torsional rigidity is preferable to dampen such noises. However, in order to dampen other forms of vibration in the clutch disk assembly, a high torsional rigidity is preferable in this region. In other words, for some situation, low rigidity is desirable and other situations, a high rigidity is desirable. A clutch disk assembly has been provided with soft springs (less rigidity) for achieving nonlinear torsion characteristics providing a low rigidity in a first portion of the overall displacement range of a clutch disk assembly, and has also been provided with rigid springs to provide a high level of rigidity in a second portion of the displacement range of the clutch disk assembly. In such a clutch disk assembly, the torsional rigidity and hysteresis torque in the first stage are low so that idling noises can be prevented effectively.

When low frequency vibrations are supplied to the damper mechanism in the conventional clutch disk assembly described above, the damper mechanism repeatedly may undergo torsion or twisting movements (relative rotary displacement between dampening members) over a wide angular range in opposite directions, where the displacement angle may be measured from a torsion free state between the positive and negative displacement ranges. In this operation, the low frequency vibrations may not be damped sufficiently because the characteristics in the displacement range have a nonlinear form.

SUMMARY OF THE INVENTION

An object of the invention is to allow effective damping of torsional vibrations caused by torsion in and between positive and negative second stages in a damper mechanism having at least two stages of torsion characteristics.

In accordance with one aspect of the present invention, a damper mechanism includes a first rotary member and a second rotary member disposed adjacent to the first rotary member for limited relative rotary displacement with respect to one another about a central rotary axis. The limited relative rotary displacement is defined by a torsion angle $\theta 4$. Within the limited relative rotary displacement, a first stage of relative rotary displacement is defined by first torsion angle $\theta 1$ that is smaller than the torsion angle $\theta 4$. A first damper mechanism is provided for circumferentially and elastically coupling the first and second rotary members together, and includes a first elastic member arranged between the first and second rotary members for transmitting torque therebetween. However, the first elastic member is not compressed in response to relative rotary displacement within the first torsion angle $\theta 1$. A second damper mechanism is disposed adjacent to the first and second rotary members for operation in parallel with the first damper mechanism for circumferentially and elastically coupling the first and second rotary members together. The second damper mechanism includes a first intermediate member operably disposed between the first and second rotary members for rotating relative to the first rotary member within a torsion angle $\theta AC$ that is smaller than the first torsion angle $\theta 1$. The second damper mechanism also includes a second elastic member arranged between the first intermediate member and the first rotary member for circumferentially and elastically coupling the first intermediate member and the first rotary member together, the second elastic member having a lower rigidity than the first elastic member. The second damper mechanism further includes a friction mechanism provided between the first intermediate member and the second rotary member for creating friction in response to relative rotation between the first intermediate member and the second rotary member.

In one embodiment of the present invention, the first and second rotary members are formed with corresponding windows. The first elastic member is disposed in both of the windows. The window in the second rotary member has a circumferential length greater than a circumferential length in the window in the first rotary member. The first torsion angle $\theta 1$ is defined by the difference in circumferential length in the windows in the first and second rotary members.

In another embodiment, the second rotary member includes a hub formed with a hub flange and a flange disposed about the hub flange. The hub flange is formed with gear teeth on a radial outer surface thereof. The flange is formed with gear teeth on a radially inner surface circumferentially spaced apart from the gear teeth on the hub flange thereby defining the first torsion angle $\theta 1$.

Preferably, a portion of the first rotary member defines an annular space between the portion of the first rotary member and the hub flange. The friction mechanism, the second elastic member and the first intermediate member are at least partially disposed in the annular space.

Preferably, the second damper mechanism provides vibration dampening throughout all of the limited relative rotary displacement between the first and second rotary members defined within the torsion angle θ4.

Preferably, the first rotary member is at least partially defined by a pair of plates, a first of the plates being formed with the portion for defining the annular space.

Preferably, the friction mechanism further includes a friction washer disposed between a second of the pair of plates and the hub flange for creating friction in response to relative rotation therebetween.

Preferably, the friction mechanism further includes a friction washer disposed between the first of the pair of plates and the first intermediate member for creating friction in response to relative rotation therebetween.

Preferably, the friction mechanism further includes a friction washer disposed between the hub and the first intermediate member for creating friction in response to relative rotation therebetween.

Preferably, the second elastic member is retained by the first of the pair of plates.

Preferably, the second elastic member is retained by a retaining member that is fixed to the first of the pair of plates.

Preferably, the retaining member is made of a resin material.

Static torsion characteristics of the damper mechanism are as follows. A first stage in the torsion characteristics is defined between zero torsion and the first torsion angle, and a second stage is defined between the first torsion angle and a second torsion angle, which is larger than the first torsion angle. In a range smaller than the second torsion angle within the first stage, the second elastic member is compressed between the first intermediate member of the second damper mechanism and the first rotary member. When the torsion angle exceeds the second torsion angle, the second elastic member is no longer compressed, and the friction mechanism generates a hysteresis torque between the first intermediate member and the second rotary member. This provides the first stage characteristics of zero rigidity and a high hysteresis torque. When the torsion angle exceeds the first torsion angle and enters the second stage, the first elastic member is compressed between the first and second rotary members so that second characteristics of a high rigidity and a high hysteresis torque are achieved.

When torsion occurs in and between the positive and negative second stages of the torsion characteristics, a high hysteresis torque occurs in the positive and negative first stages between the positive and negative second stages. As described above, the friction mechanism operates in the region of the first stage to produce the high hysteresis torque. Therefore, low frequency vibrations such as tip-in/tip-out can be effectively damped.

When the damper mechanism is supplied with minute vibrations of a small amplitude in the first and second stages, no slide occurs in the friction mechanism so that the characteristics of a low hysteresis torque are achieved. In this state, the damper mechanism operates through an angular range substantially twice as large as the second torsion angle.

BRIEF DESCRIPTION OF THE DRAWINGS

FIG. 14 is a mechanical circuit diagram of the interactive movements between various members of the clutch disk assembly depicted in FIG. 13.

DESCRIPTION OF THE PREFERRED EMBODIMENTS

First Embodiment

Figure 1:
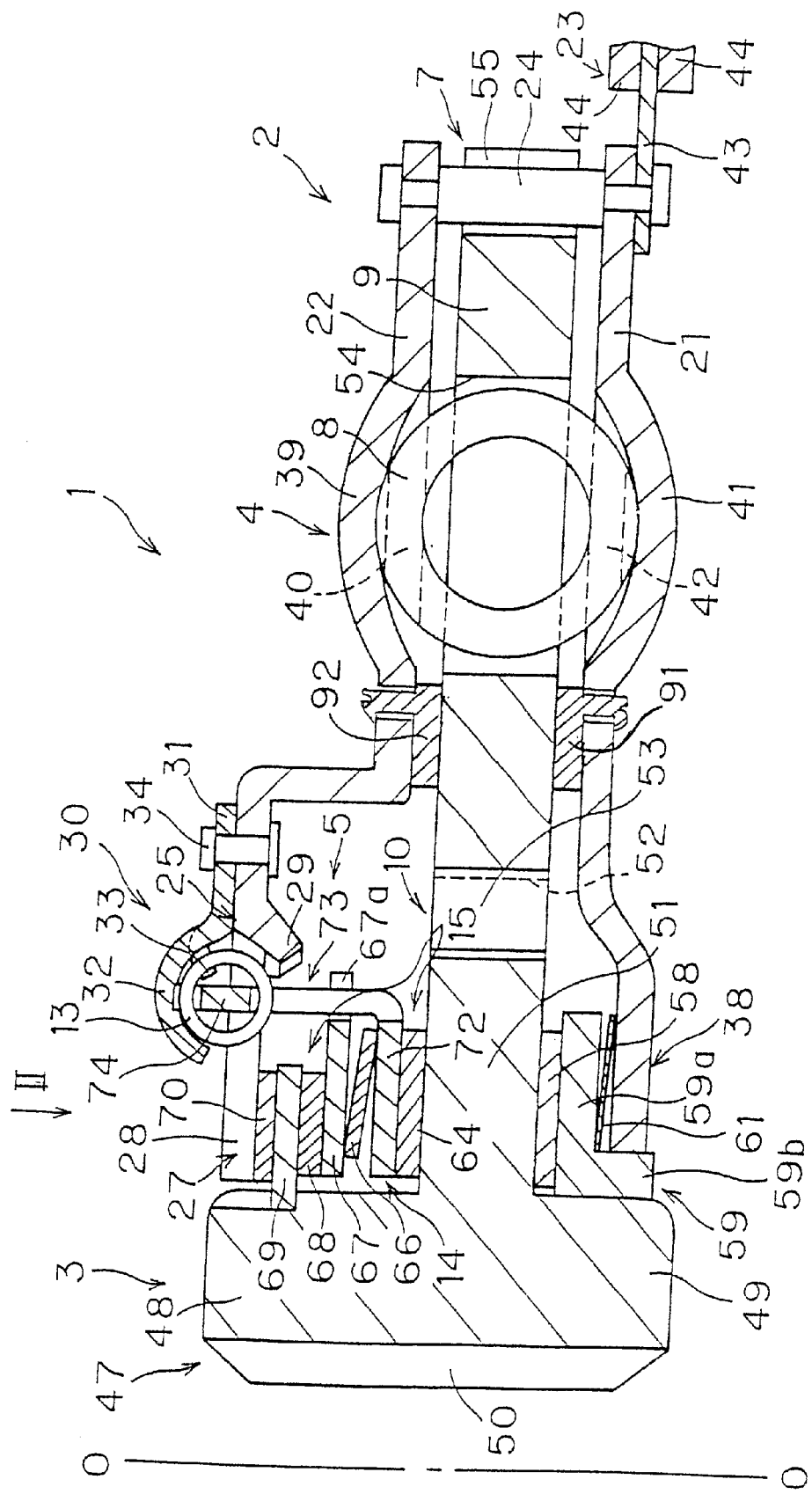
FIG. 1 is a fragmentary cross section of a clutch disk assembly in accordance with a first embodiment of the present invention.

FIG. 1 is a fragmentary cross section of a clutch disk assembly 1 of an embodiment of the invention. The clutch disk assembly 1 is configured for use with a power transmission device such as a clutch mechanism in an automotive vehicle, and includes a damper mechanism. In FIG. 1, 0—0 represents an axis of rotation defined by rotary shaft of, for instance, a transmission input shaft.

The clutch disk assembly 1 includes an input rotary member 2 (which includes an annular clutch friction disk, a clutch plate and a retaining plate), an output rotary member 3 (which includes a hub), a first damper mechanism 4, a second damper mechanism 5 and a low hysteresis torque generating mechanism 6, all of which are described in greater detail below.

The input rotary member 2 is configured for engagement with flywheel (not shown) for receiving torque. The input rotary member 2 includes a clutch plate 21, a retaining plate 22 and a clutch disk 23. The clutch plate 21 and the retaining plate 22 may both be made of pressed metal plates, and are non-rotatably fixed together at an outer periphery there of, with an annular space defined at a radial inward portion therebetween. The clutch plate 21 is arranged on an engine side of the clutch disk assembly 1, and the retaining plate 22 is arranged on a transmission side of the clutch disk assembly. Hereinafter it should be understood that the term engine side refers generally to the bottom side of FIG. 1 and the term transmission side refers to the top side of FIG. 1.

The plates 21 and 22 have outer peripheral portions which are fixed together by a plurality of stop pins 24.

The clutch disk 23 is arranged radially outside the plates 21 and 22, and is fixed to the outer periphery of the clutch plate 21. The clutch disk 23 is made of an annular plate 43 and friction facings 44, which are fixed to the axially opposite sides of the plate 43, respectively. The plates 43 may include a cushioning function between the opposite friction facings 44. The flywheel (not shown) is arranged to the right side of FIG. 1 and contacts the corresponding friction facing 44. A pressure plate (not shown) is arranged on the left side of FIG. 1.

The output rotary member 3 is a member for outputting the torque, which is supplied from the input rotary member 2, to another member such as the input shaft of a transmission (not shown). In this embodiment, the output rotary member 3 takes the form of a hub. The output rotary member 3 has a boss 47 arranged in central apertures of the plates 21 and 22. The boss 47 is a cylindrical member which is rotatably arranged in the central apertures of the plates 21 and 22, and has a radially outward flange 51. The flange 51 is formed on the axially intermediate portion of the boss 47. A portion of the boss 47 located on the transmission side with respect to the flange 51 is referred to hereinafter as a first cylindrical portion 48, and a portion on the engine side is referred to as a second cylindrical portion 49. The output rotary member 3 is provided at its inner periphery with a spline aperture 50. Spline teeth on a main drive shaft extending from the transmission are engaged into the spline aperture 50. As a result, the output rotary member 3 is non-rotatable but axially movable with respect to the transmission input shaft (not shown) so that torque can be transmitted from the output rotary member 3 to the transmission input shaft.

The first damper mechanism 4 is described below. The first damper mechanism 4 is a damper mechanism for circumferentially and elastically coupling the output and input rotary members 3 and 2 together, and damping torsional vibrations therebetween. The first damper mechanism 4 is formed of a hub flange 9 (a second intermediate member) and first springs 8 (first elastic members). The hub flange 9 is a circular or annular member arranged radially outside the flange 51 of the boss 47. The flange 51 is provided at its outer periphery with a plurality of outer teeth 52, and the hub flange 9 is provided at its inner periphery with a plurality of inner teeth 53 (shown in phantom in FIG. 1). The outer and inner teeth 52 and 53 are located alternately and are circumferentially spaced from each other so that a space of a first torsion angle θ1 is defined between each outer tooth 52 and each of the inner teeth 53 on the circumferentially opposite sides of the same. In other words, the hub flange 9 and the flange 51 may undergo a limited amount of relative rotary displacement within the first torsion angle θ1 defined by the teeth 52 and 53. The first torsion angle θ1 is schematically depicted in FIGS. 4, 7, 11 and 12. The inner and outer teeth 53 and 52 form a second stop 10 (depicted in FIGS. 4–10). The second stop 10 restricts a torsion angular displacement between the output rotary member 3 and the hub flange 9.

The hub flange 9 is provided at its radially middle portion with a plurality of circumferentially spaced windows 54. The first springs 8 are arranged in the windows 54, respectively. The first springs 8 are provided for circumferentially and elastically coupling the hub flange 9 and portions of the input rotary member 2 together, and the first springs 8 are adapted to be circumferentially compressed between the input and output rotary members 2 and 3 when the torsion angle of the clutch disk assembly 1 is in a range exceeding the first torsion angle θ1. Each first spring 8 is a coil spring, and has the opposite ends in contact with or close to the circumferentially opposite edges of the corresponding window 54, respectively.

The plates 21 and 22 are provided with window portions 39 and 41 at positions corresponding to the windows 54. The window portions 39 and 41 are formed by deforming and/or cutting plate material to cause the material to extend around the first springs 8, as indicated in FIG. 1. The window portions 39 and 41 accommodate the first springs 8, and restrict the axial and radial movement of the first springs 8. The plates 22 and 21 are provided with contact portions 40 and 42, respectively, at each circumferentially opposite end of each of the window portions 39 and 41 such that the contact portions 40 and 42 are in contact with or are contactable with circumferentially opposite ends of corresponding first spring 8. In the above manner, the hub flange 9 is circumferentially and elastically coupled to the plates 21 and 22 through the first springs 8. The hub flange 9 is radially positioned with respect to the plates 21 and 22 through the first springs 8.

Figure 1A:
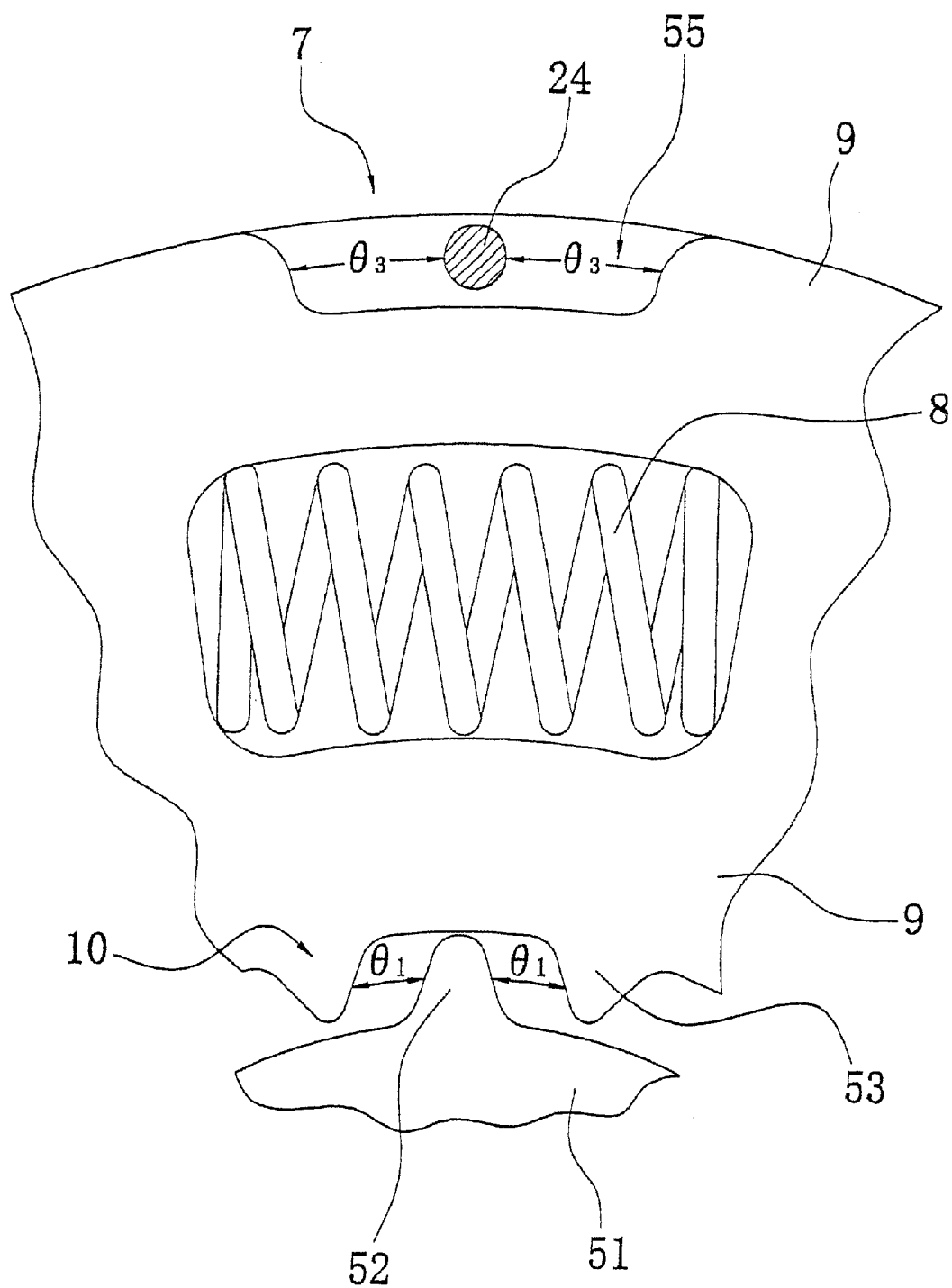
FIG. 1A is a fragmentary, part cross section of a portion of the clutch disk depicted in FIG. 1.

The hub flange 9 is provided at its outer periphery with recesses 55, through which the stop pins 24 extend, respectively, as shown in FIG. 1A. Each stop pin 24 is spaced from each of the circumferentially opposite ends of the corresponding recess 55 by a space defined by a predetermined torsion angle θ3. The stop pins 24 and the recesses 55 form a first stop 7. The first stop 7 restricts relative rotation between the hub flange 9 and the input rotary member 2.

First and second washers 91 and 92 are members that assist in maintaining the axial position of the hub flange 9 with respect to the plates 21 and 22. The first washer 91 is arranged between the radially middle portion of the clutch plate 21 and the hub flange 9. The second washer 92 is arranged between the radially middle portion of the retaining plate 22 and the hub flange 9. The first washer 91 has axially extending portions, which are engaged with the clutch plate 21 for rotation together with the clutch plate 21. The second washer 92 has axially extending portions, which are engaged with the retaining plate 22 for rotation together with the retaining plate 22. The washers 91 and 92 are in slidable and rotatable contact with the hub flange 9, but are designed not to cause large friction between them since their main purpose is to maintain the axial position of the hub flange 9.

The second damper mechanism 5 is described below. The second damper mechanism 5 is operably disposed between the input and output rotary members 2 and 3 and in parallel with the first damper mechanism 4 for transmitting torque and damping torsional vibrations. The second damper mechanism 5 is axially located on the transmission side of the flange 51, as shown in FIG. 1. The second damper mechanism 5 includes second springs 13 (second elastic members), an intermediate plate 14 (first intermediate member) and a hysteresis torque generating mechanism 15 (friction mechanism) formed of a plurality of washers or the like.

An inner peripheral portion 25 of the retaining plate 22 extends axially inward around the first cylindrical portion 48 of the boss 47 and, more specifically, around a portion thereof on the transmission side. Further, the inner peripheral portion 25 of the retaining plate 22 is axially spaced from the flange 51 to define an annular space between the inner peripheral portion 25 and the flange 51. The plurality of washers or the like described above are arranged in this space.

Figure 2:
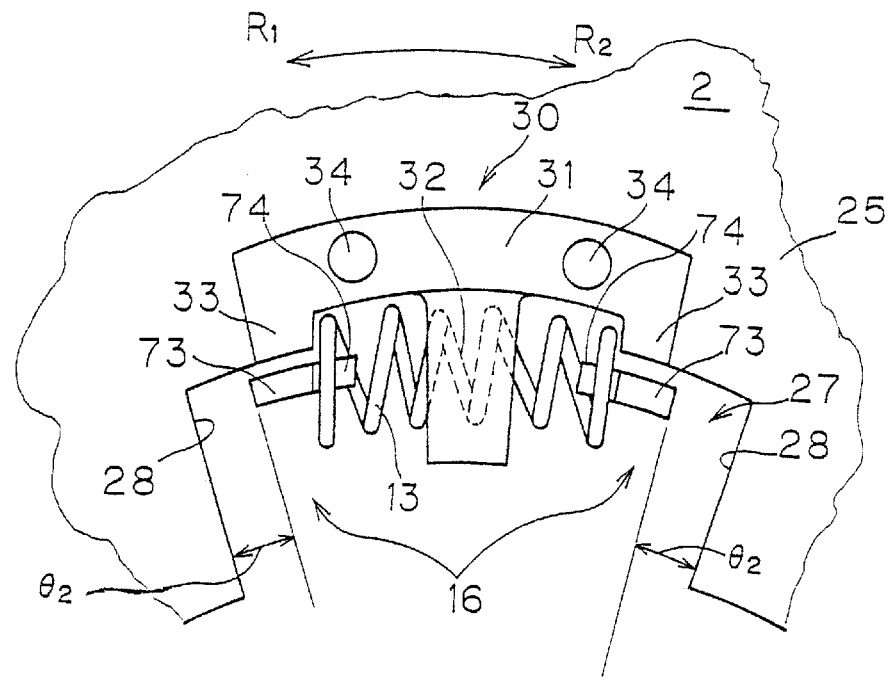
FIG. 2 is a fragmentary end view of a portion of the clutch disk assembly looking in the direction of the arrow II in FIG. 1.

As shown in FIGS. 1 and 2, a plurality of recesses 27 (accommodating portions) are formed in the inner periphery of the inner peripheral portion 25. Each recess 27 is open toward a radially inward portion of the clutch disk assembly 1, and specifically, each recess 27 is open toward the first cylindrical portion 48 of the boss 47. Each recess 27 has a predetermined circumferential length, as indicated in FIG. 2. The circumferentially opposite sides of each recess 27 define circumferentially opposite end surfaces hereinafter referred to as engagement portions 28. In other words, the plurality of recesses 27 define the plurality of engagement portions 28. The engagement portions 28 extend in a radial direction along an inner periphery of the inner peripheral portion 25.

Support members of retaining members 30 are fixed to the transmission side of the inner peripheral portion 25 at positions corresponding to the recesses 27. Each support member 30 is circumferentially engaged with a corresponding second spring 13. One second spring 13 is disposed in each corresponding recess 27. The support members 30 restrict the axial and radial movement of the second springs 13. The support member 30 is shown from one end in FIG. 2 and has a predetermined configuration that includes an arc-shaped portion 31, a holder portion 32 extending from the arc-shaped portion 31, and engagement portions 33 extending from the opposite ends of the arc-shaped portion 31. The arc-shaped portion 31 is flat, and is fixed to the inner peripheral portion 25 by rivets 34. The arc-shaped portion 31 extends along an arc in the circumferential direction (rotating direction) of the clutch disk assembly 1. In FIG. 2, R1 indicates a rotating direction (positive side) of the clutch disk assembly 1, and R2 indicates a reverse direction (negative side).

The holder portion 32 extends radially inward from the circumferentially central portion of the arc-shaped portion 31, and is curved for supporting the second spring 13 from the transmission side. The engagement portions 33 are engaged with (in contact with) the circumferentially opposite ends of the second spring 13. Further, holder portions 29 which are formed in the inner peripheral portion 25 and correspond to the recesses 27, respectively, axially retain the second springs 13 from the engine side, respectively.

Between the flange 51 and the inner peripheral portion 25, the following members are arranged: a first high friction member 64; the intermediate plate 14; a second biasing member 66; a plate 67; a second high friction member 68; a third plate 69; and a second low friction member 70 in the given order from the flange 51. All of the washers 64, 68 and 70 and members 14, 66 and 69 are annular plates arranged around the first cylindrical portion 48, and are in axial contact with adjacent members. The high friction members 64 and 68 described below have a much larger friction coefficient than the low friction members 70, 91 and 92.

The first high friction member 64 is in contact with an adjacent surface of the flange 51 on the transmission side thereof, as shown in FIG. 1. The intermediate plate 14 is formed with an annular plate portion 72 that is in contact with the first high friction member 64. The intermediate plate 14 has a plurality of arms 73 extending from the outer periphery of the annular plate portion 72 extending toward the transmission. The arms 73 extend to the circumferentially opposite ends of the respective second springs 13, and are engaged with (in contact with) the circumferentially opposite ends of the second spring 13. Owing to the above structures, the support members 30 (i.e., retaining plate 22) and the intermediate plate 14 are circumferentially and elastically coupled together through the second springs 13.

Each arm 73 has an insertion portion 74 that extends into the second spring 13, as shown in FIG. 2. A second torsion angle θ2 is defined between each arm 73 and the surface of the circumferential end of the engagement portion 28 (surface of the circumferential end of the recess 27), also shown in FIG. 2. As can be seen from FIG. 2, the arms 73 (i.e., the intermediate plate 14) may move with respect to the support members 30 (i.e., the retaining plate 22) through a rotational range corresponding to the second torsion angle θ2 and, more exactly, a range of an angle θAC twice as large as the second torsion angle θ2. In other words, the maximum torsion angle range allowed by the second spring 13 is equal to the defined by the angle θAC, shown in FIG. 5. The second torsion angle θ2 is smaller than the first torsion angle θ1.

It should be understood that the intermediate plate 14 is a floating member that is retained in place by contact with the springs 13 and by contact with the friction members of the second damper mechanism 5, as described in greater detail below.

The second biasing member 66 is a conical spring, and is axially compressed between the annular plate portion 72 and the plate 67. The plate 67 has inner projections 67a, which are non-rotatably engaged with the arms 73 of the intermediate plate 14. However, the plate 67 may move axially with respect to the arms 73 of the intermediate plate 14. The second high friction member 68 is disposed between the third plate 69 and the plate 67. The third plate 69 is disposed between the second high friction member 68 and the second low friction member 70. The third plate 69 has an inner peripheral portion which is non-rotatably engaged with a groove formed on the outer periphery of the first cylindrical portion 48. The third plate 69 may undergo axial movement with respect to the groove formed on the outer periphery of the first cylindrical portion 48. The second low friction member 70 is arranged between the third plate 69 and the inner peripheral portion 25 of the retaining plate 22.

Owing to the arrangement of the washers and other member of the second damper mechanism 5 described above, the annular plate portion 72 of the intermediate plate 14 is frictionally engaged with the flange 51 through the first high friction member 64. The plate 67 which rotates together with the intermediate plate 14 is frictionally engaged with the third plate 69, which rotates together with the output rotary member 3, through the second friction member 68. The foregoing structures defines the high hysteresis torque generating mechanism 15, which is arranged between the output rotary member 3 and the intermediate plate 14, and has two frictionally engaged portions. The retaining plate 22 and the third plate 69 are frictionally engaged with each other through the second low friction member 70. The second low friction member 70 defines a portion of the low hysteresis torque generating mechanism 6, described further below.

Owing to use of the support members 30, a complicated structure is not required for supporting the second springs 13 on the retaining plate 22. The support members 30, i.e., members independent of the retaining plate 22 can be used for supporting the second springs 13 owing to the structure that the second springs 13 are arranged in the recesses 27 of the retaining plate 22, respectively. The second springs 13 can be located in the recesses 27 of the retaining plate 22. Consequently, the second springs 13 are arranged in series with the high hysteresis torque generating mechanism 15 and in parallel with the first springs 8, which have a high rigidity.

In the above second damper mechanism 5, the second springs 13 are not directly attached to the output rotary member 3 (hub). This facilitates design of the structure around the hub. Particularly in the structure of this embodiment, the outer and inner teeth 52 and 53 can be arranged around the entire circumference of the flange 51 and hub flange 9, respectively, and therefore the number of gear teeth of the outer and inner teeth 52 and 53 can be maximized thus increasing the total contact area between the outer and inner teeth 52 and 53. As described above, direct engagement is not required between the second springs 13 and the output rotary member 3. This is possible because of the structure surrounding the second springs 13 which have a low rigidity and are arranged in parallel with the first springs 8 and in series with the high hysteresis torque generating mechanism 15.

The structure on the axial engine side of the flange 51 is now described below. A bushing 59, a first low friction member 58 and a first biasing member 61 to be described below are annular plate members arranged around the second cylindrical portion 49, respectively. The bushing 59 is arranged near an inner peripheral portion 38 of the clutch plate 21. The bushing 59 is formed of a circular plate portion 59a arranged between the flange 51 and the inner peripheral portion 38, and a cylindrical portion 59b extending axially toward the engine from the inner periphery of the circular plate portion 59a. The cylindrical portion 59b is axially movably engaged with the inner peripheral portion 38 of the clutch plate 21 and can rotate together with the inner peripheral portion 21. The inner peripheral surface of the cylindrical portion 59b is in contact with the outer peripheral surface of the second cylindrical portion 49 of the boss 47. Thereby, the clutch plate 21 and the retaining plate 22 are radially positioned with respect to the hub 3. The first low friction member 58 is arranged between the circular plate portion 59a and the flange 51, and the first biasing member 61 is arranged between the circular plate portion 59a and the inner peripheral portion 38. The first biasing member 61 is a conical spring, and is axially compressed between the circular plate portion 59a and the inner peripheral portion 38. Thus, the bushing 59 is frictionally engaged with the flange 51 through the first friction member 58. The biasing force of the first biasing member 61 is smaller than that of the second biasing member 66. In the structure described above, the first low friction member 58 forms a portion of the low hysteresis torque generating mechanism 6.

The low hysteresis torque generating mechanism 6 is a friction generating mechanism operably disposed between the input rotary member 2 and the output rotary member 3, and creates sliding friction whenever the input and output rotary members 2 and 3 rotate relative to each other. In this embodiment, the low hysteresis torque generating mechanism 6 is basically formed of the first and second low friction members 58 and 70, but may have include other friction members or have a slightly different configuration. In some cases, it is desirable to minimize the hysteresis torque generated by the low hysteresis torque generating mechanism 6, therefore, only one low friction member might be employed in some configurations.

Figure 4:
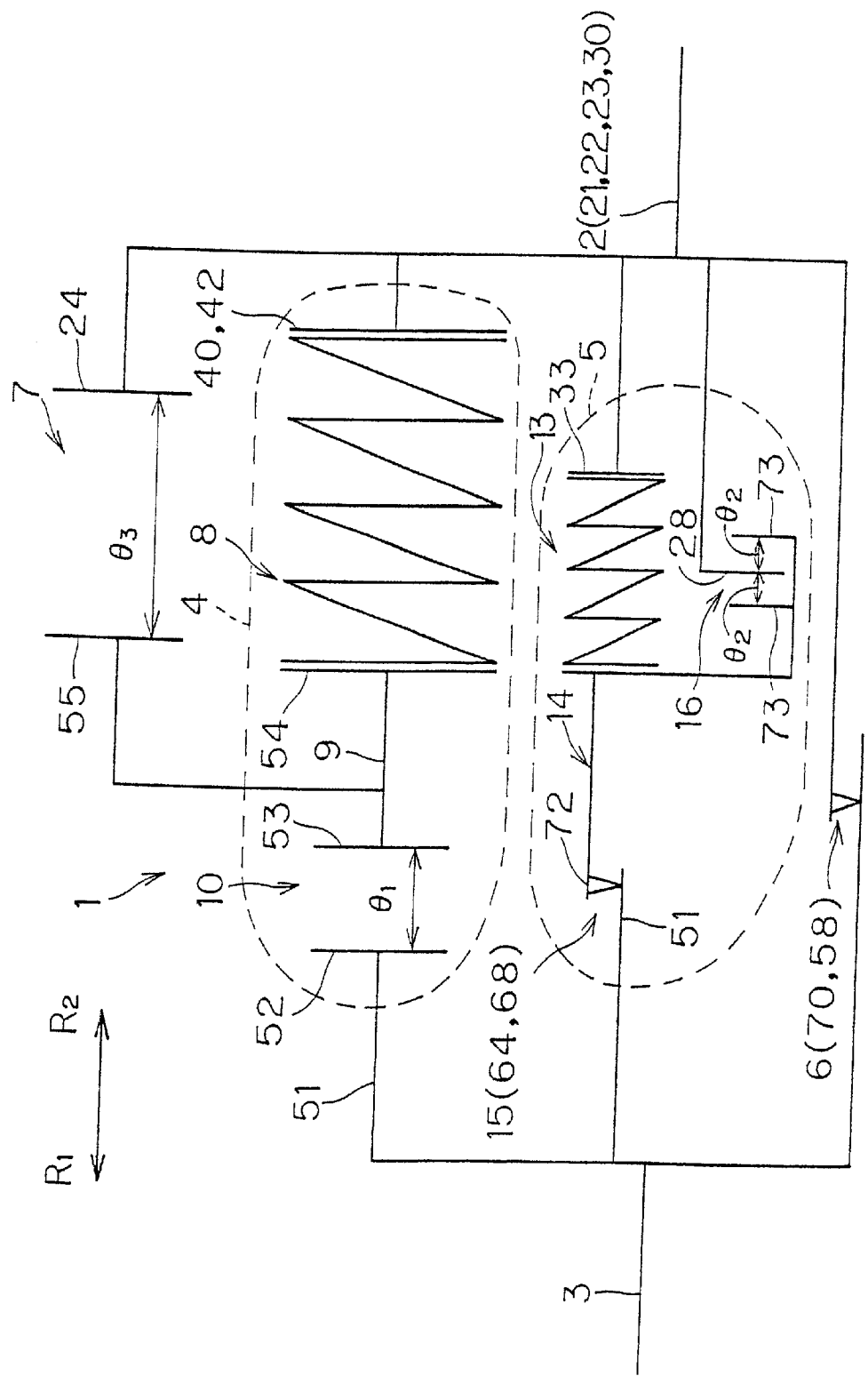
FIG. 4 is a mechanical circuit diagram representing the interactive movement between the various members of the clutch disk assembly of the present invention (including both embodiments in FIGS. 1, 2 and 3), with the clutch disk assembly shown in a neutral state, with no torque applied.

The structure and operation of the clutch disk assembly 1 is now described below in more detail with reference to FIG. 4. FIG. 4 is a mechanical circuit diagram of the damper mechanisms of the clutch disk assembly 1. The mechanical circuit diagram schematically shows the various relatively rotatable portions of the damper mechanisms. The representation in FIG. 4 is indicative of operations and relationships of respective members in the state where there is no torsion or torque being applied between the output rotary member 3 and the input rotary member 2. As can be seen from FIG. 4, the first and second damper mechanisms 4 and 5 are arranged in parallel between the input rotary member 2 and the output rotary member 3. The first damper mechanism 4 is basically formed of the first springs 8 and the hub flange 9. The first springs 8 are arranged between the hub flange 9 and the input rotary member 2. The recess 55 and the stop pin 24 define a first stop 7 having an arcuate length (in each rotational direction) of the torsion angle θ3.

Figure 12:
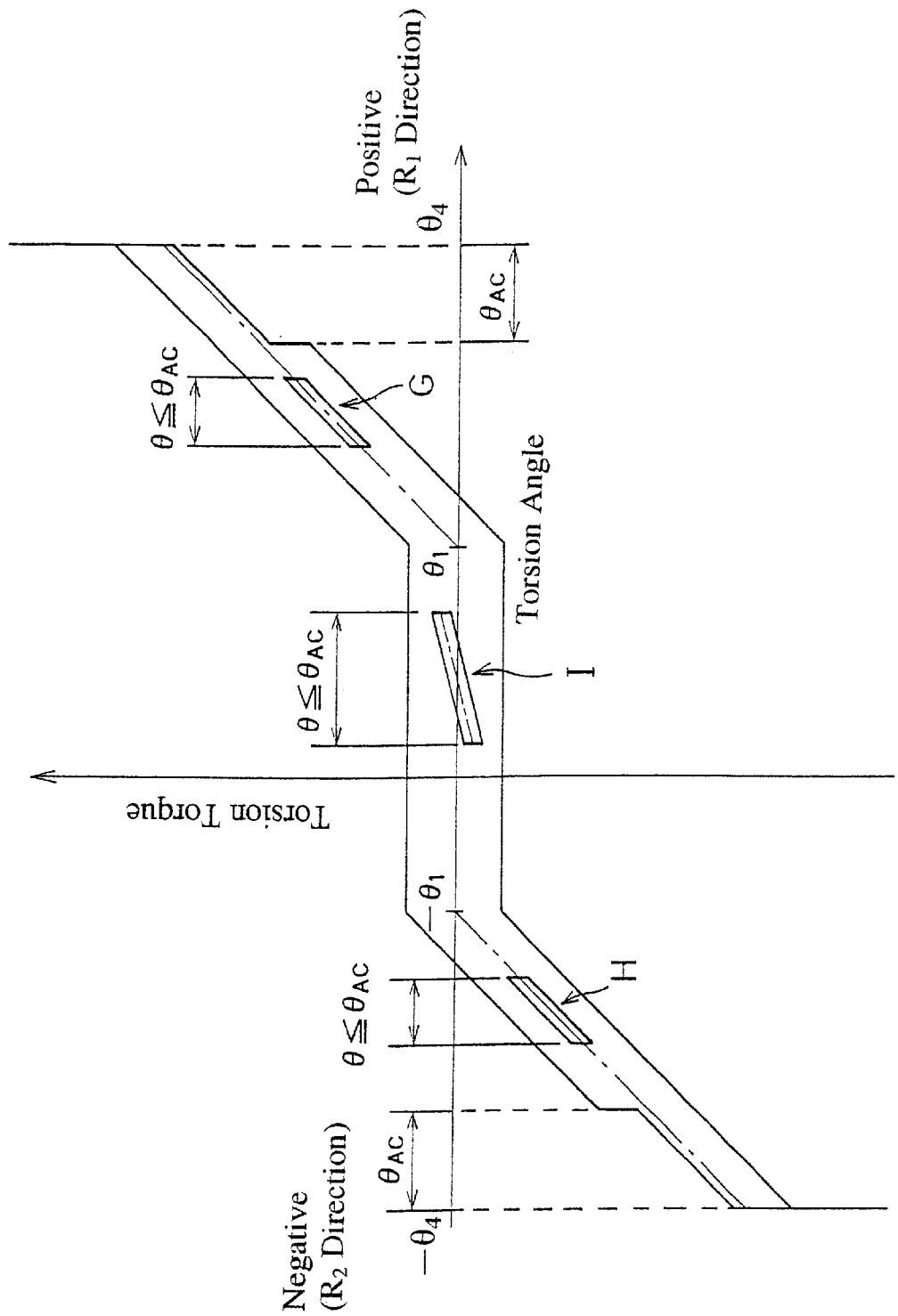
FIG. 12 is another diagram showing force and displacement representing torsion response characteristics of the clutch disk assembly.

As is indicated in FIG. 12 and explained in greater detail below, the maximum relative rotary displacement between the flange 51 and the input rotary member 2 is defined by a torsion angle θ4. The torsion angle θ4 is equal to the torsion angle θ3 plus the torsion angle θ1 in one direction (the R1 direction or the R2 direction), as is explained further below. The arcuate length of the first torsion angle θ1 is defined in the second stop 10 between the teeth 52 and 53 of output rotary member 3 and the hub flange 9. The first torsion angle θ1 thus defines the limit of rotary displacement between the flange 51 and the hub flange 9. The torsion angle θ3 defines the limit of relative rotation between the hub flange 9 and the plates 21 and 22 and is defined in the first stop 7.

Each first spring 8 has a high rigidity which does not operate in the first torsion angle θ1, since movement associated with the first torsion angle θ1 is between the flange 51 and the hub flange 9. Thus, the first spring 8 is arranged in series with the displacement angle θ1 of the second stop 10 such that as displacement occurs within the torsion angle θ1, the first spring 8 is not compressed.

The second damper mechanism 5 is basically formed of the second springs 13 and the intermediate plate 14. Each second spring 13 has a lower rigidity than the first spring 8. The second spring 13 is arranged between the intermediate plate 14 and the input rotary member 2. The second torsion angle θ2 is defined between each of the circumferentially opposite sides of the intermediate plate 14 and the adjacent engagement portion 28 of the input rotary member 2. This space defined between opposite sides of the intermediate plate 14 and the adjacent engagement portion 28 defines a third stop 16. The third stop 16 defines a limit to relative rotary displacement between the intermediate plate 14 and the input rotary member 2. The third stop 16, which is defined also by the second torsion angle θ2, allows relative rotation between the intermediate plate 14 and the input rotary member 2 independent of the displacement in the first stop 7 and the second stop 10. In other words, vibration dampening as a result of displacement in the first stop 7 or displacement in the second stop 10 can occur in the damping members which define the third stop 16, as is described further below. As described above, the second spring 13 has a low rigidity and the third stop 16, which allows relative rotation defined within the second torsion angle θ2 for damping minute vibrations, function in parallel between the intermediate plate 14 and the input rotary member 2. The intermediate plate 14 and the output rotary member 3 are frictionally coupled together through the high hysteresis torque generating mechanism 15. Thus, in the second damper mechanism 5, the second spring 13 having a low rigidity and the high hysteresis torque generating mechanism 15 for generating a high hysteresis torque are arranged in series, operating together.

In the second damper mechanism 5, the position where the second spring 13 and the third stop 16 (the second torsion angle θ2) are arranged may alternatively be interchanged with the position of the high hysteresis torque generating mechanism 15.

The output rotary member 3 and the input rotary member 2 are frictionally engaged with each other via the low hysteresis torque generating mechanism 6, which includes the first and second low friction members 58 and 70. The friction, i.e., the hysteresis torque produced in the low hysteresis torque generating mechanism 6 is much lower than friction produced in the high hysteresis torque generating mechanism 15.

Alternatively, the low hysteresis torque generating mechanism 6 may be arranged in another position, and more specifically may be arranged between the intermediate plate 14 and the input rotary member 2, between the output rotary member 3 and the hub flange 9 or between the hub flange 9 and the input rotary member 2.

Operation of the clutch disk assembly 1 is now described below. When the clutch disk 23 is engaged with the flywheel, the torque is transmitted from the input rotary member 2 to the output rotary member 3 via the first and second damper mechanisms 4 and 5. In the first damper mechanism 4, the torque is transmitted via the first springs 8 and the hub flange 9. In the second damper mechanism 5, the torque is transmitted via the second springs 13 and the intermediate plate 14.

Figure 11:
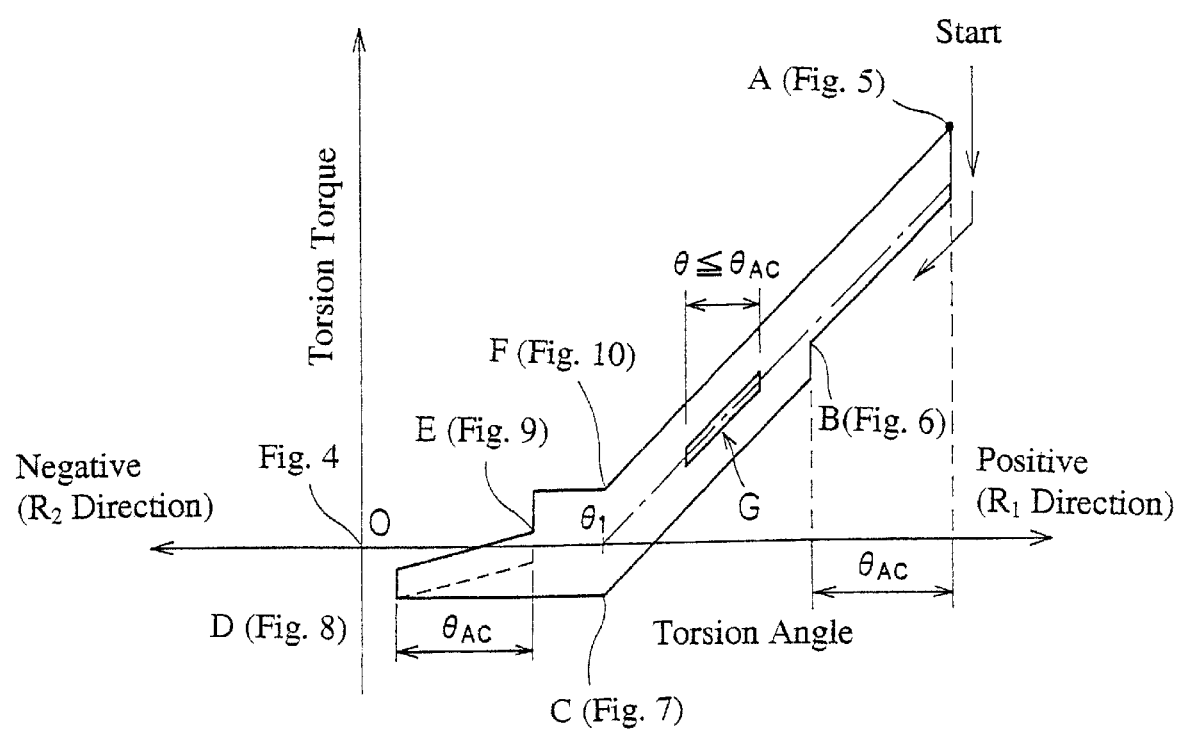
FIG. 11 is a diagram showing force and displacement representing torsion response characteristics of the clutch disk assembly.

Torsion characteristics of the clutch disk assembly 1 are now described below with reference to FIG. 11. The torsion characteristic diagram of FIG. 11 represents response characteristics wherein the output rotary member 3 undergoes relative rotary displacement with respect to the input rotary member 2. The point 0 (origin) of the graph shown in FIG. 11 represents a point where no displacement occurs in the clutch disk assembly 1 since there is no torque or torsion being applied. The point 0, or origin, corresponds to the relative positions of the various elements depicted in FIG. 4. In FIG. 11, the curve depicted represents relative rotation of the output rotary member 3 of the clutch disk assembly 1 being twisted with respect to the input rotary member 2.

Figure 5:
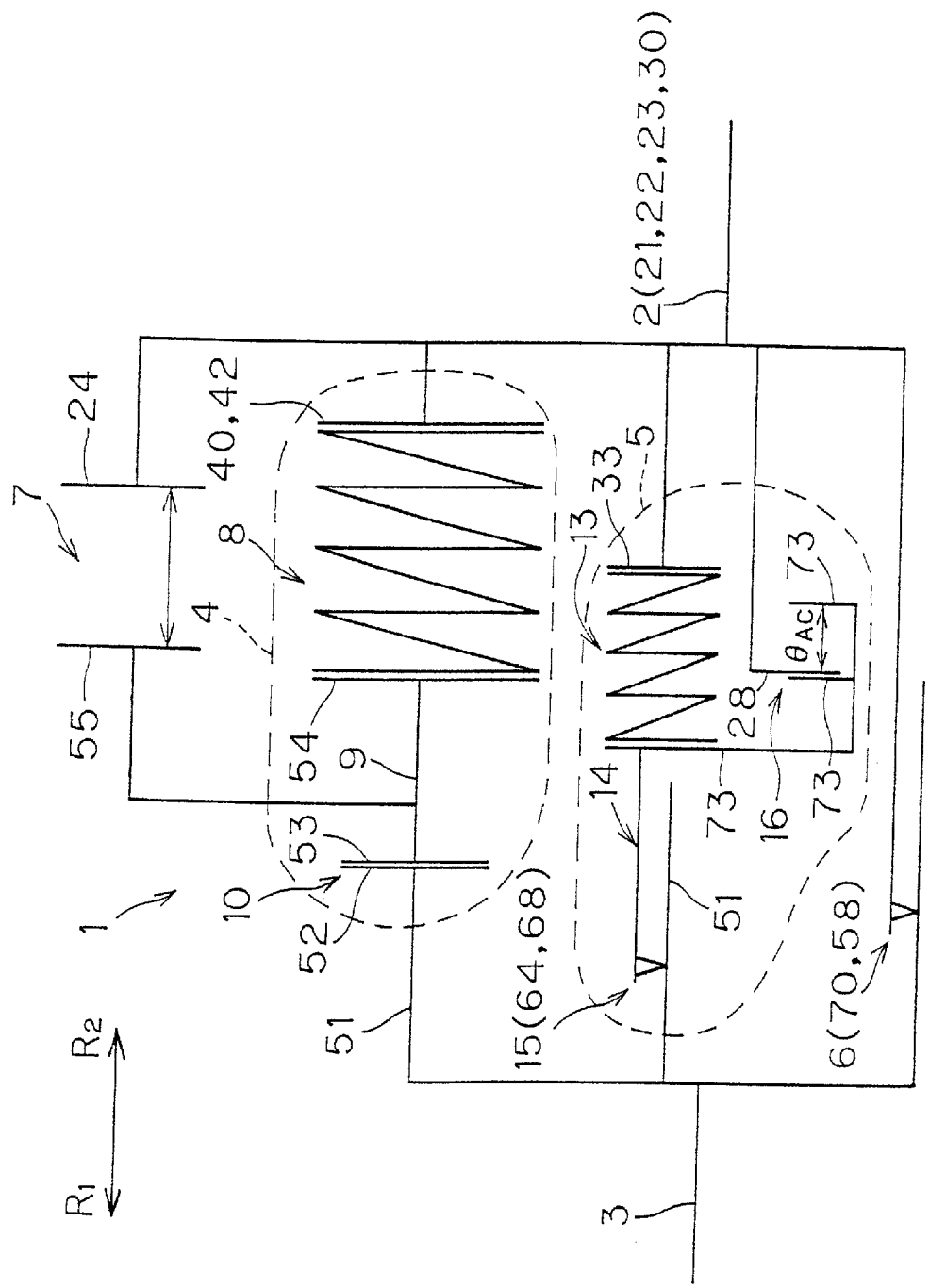
FIG. 5 is another mechanical circuit diagram showing the clutch disk assembly in one operating state with a first level of torque and/or torsion applied in one rotational direction.
Figure 6:
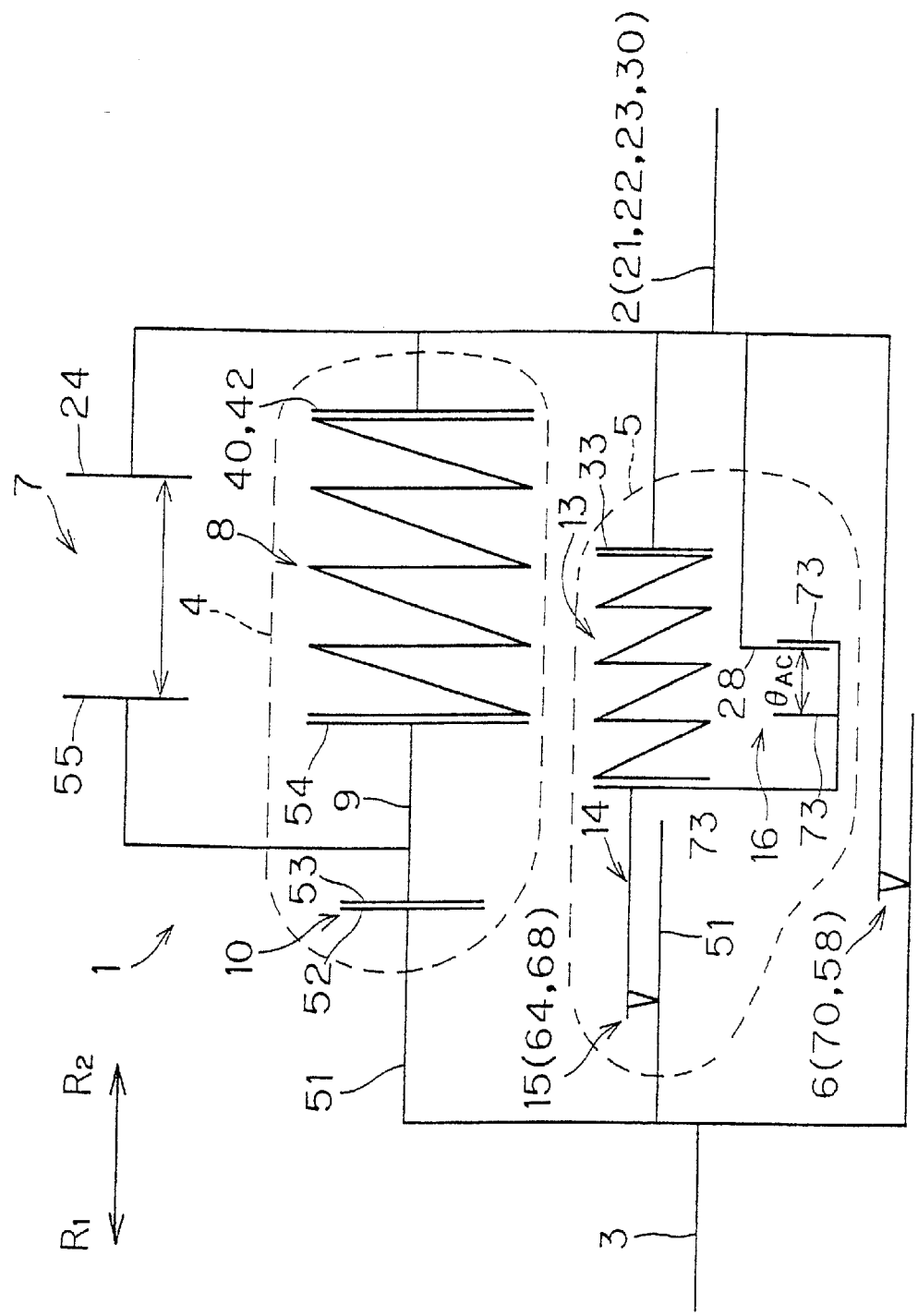
FIG. 6 is a mechanical circuit diagram showing the clutch disk assembly in another operating state.

At a point A in FIG. 11, the output rotary member 3 of the clutch disk assembly 1 has been twisted with respect to the input rotary member 2 by an angle that is less than the total possible relative rotation defined by the torsion angle $\theta 4$ (FIG. 12) but greater than the first torsion angle $\theta 1$. The point A corresponds to the relative positions of the various elements depicted in FIG. 5. In FIG. 5, the output rotary member 3 is twisted in a positive displacement direction with respect to the input rotary member 2.

In FIG. 5, the first damper mechanism 4 is such that the gear teeth 52 and 53 contact one another in the second stop 10, and each first spring 8 is partially compressed between the hub flange 9 and the input rotary member 2. In the second damper mechanism 5 the end faces 28 contact corresponding arms 73 in the third stop 16. Further, each second spring 13 is compressed such that further compression is not possible. However, the intermediate plate 14 is shown undergoing relative rotary displacement in a negative direction with respect to the input rotary member 2 through the angle $\theta AC$ (the angle $\theta AC$ is twice as large as the second torsion angle $\theta 2$). As a result, the end surface of the engagement portion 28 on the circumferentially positive side is in contact with the projection 73, and the end surface of the engagement portion 28 on the circumferentially negative side is spaced apart from the opposed projection 73 by a space defined by the angle $\theta AC$.

As the output rotary member 3 rotates from the above position toward the position of the origin or 0 angle (FIG. 4), the first and second springs 8 and 13 must expand. In the region of angular displacement approximately equal to the magnitude of $\theta AC$ before contact occurs in the third stop 16, as shown in the mechanical circuit diagram FIG. 6, slide does not occur in the high hysteresis torque generating mechanism 15, and a low hysteresis torque is primarily produced in the low hysteresis torque generating mechanism 6.

At a point B in FIG. 11, contact occurs in the third stop 16 (FIG. 6) between the end surface of the engagement portions 28 on the circumferentially negative side and corresponding arms 73. Thereafter, the intermediate plate 14 rotates together with the input rotary member 2, and relative rotation occurs between the intermediate plate 14 and the output rotary member 3. Thus, the first springs 8 expand, and slide occurs in the high hysteresis torque generating mechanism 15. As a result, characteristics of a high rigidity and a high hysteresis torque are produced.

Figure 7:
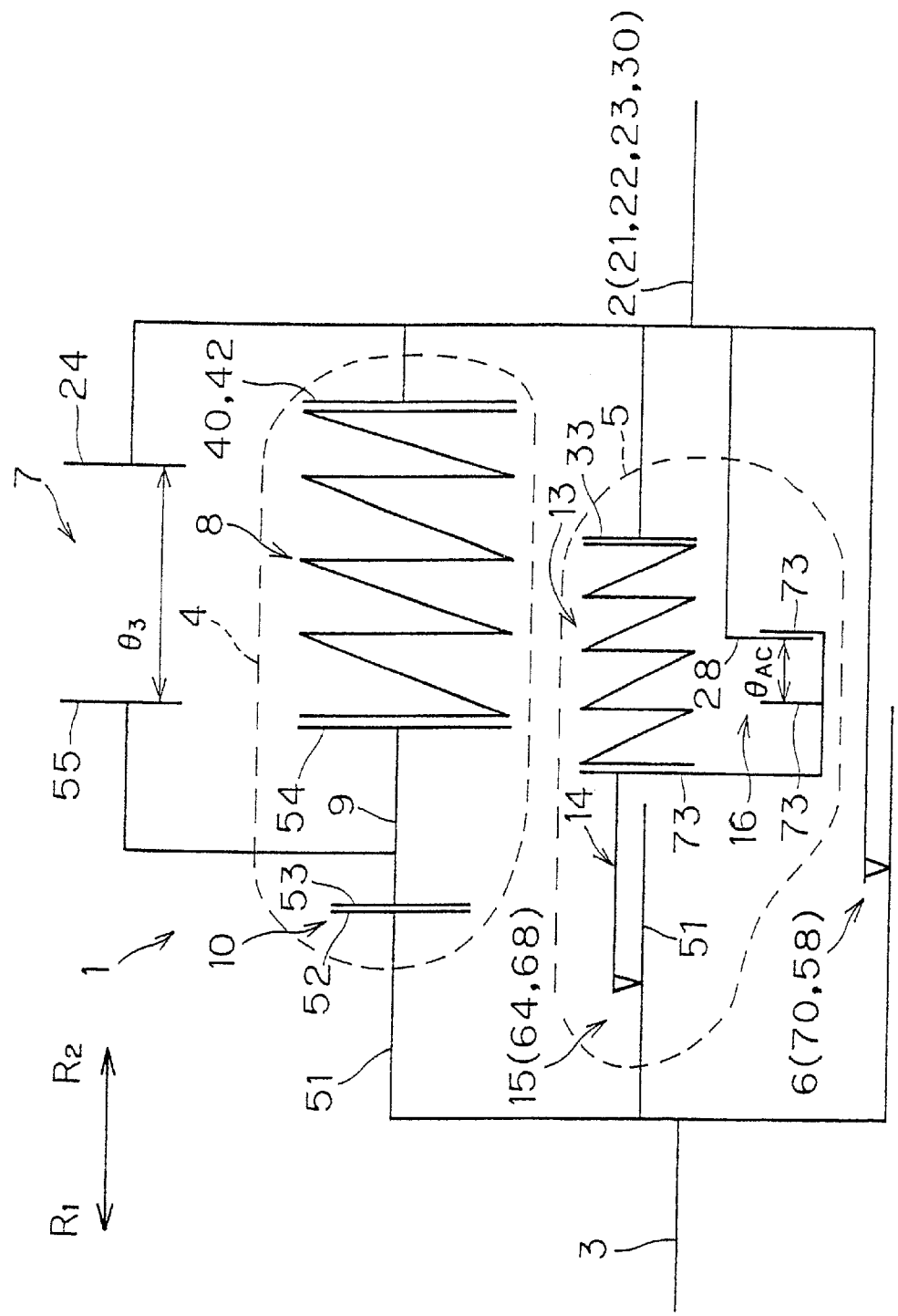
FIG. 7 is a view of a mechanical circuit diagram showing the clutch disk assembly in another operating state.
Figure 8:
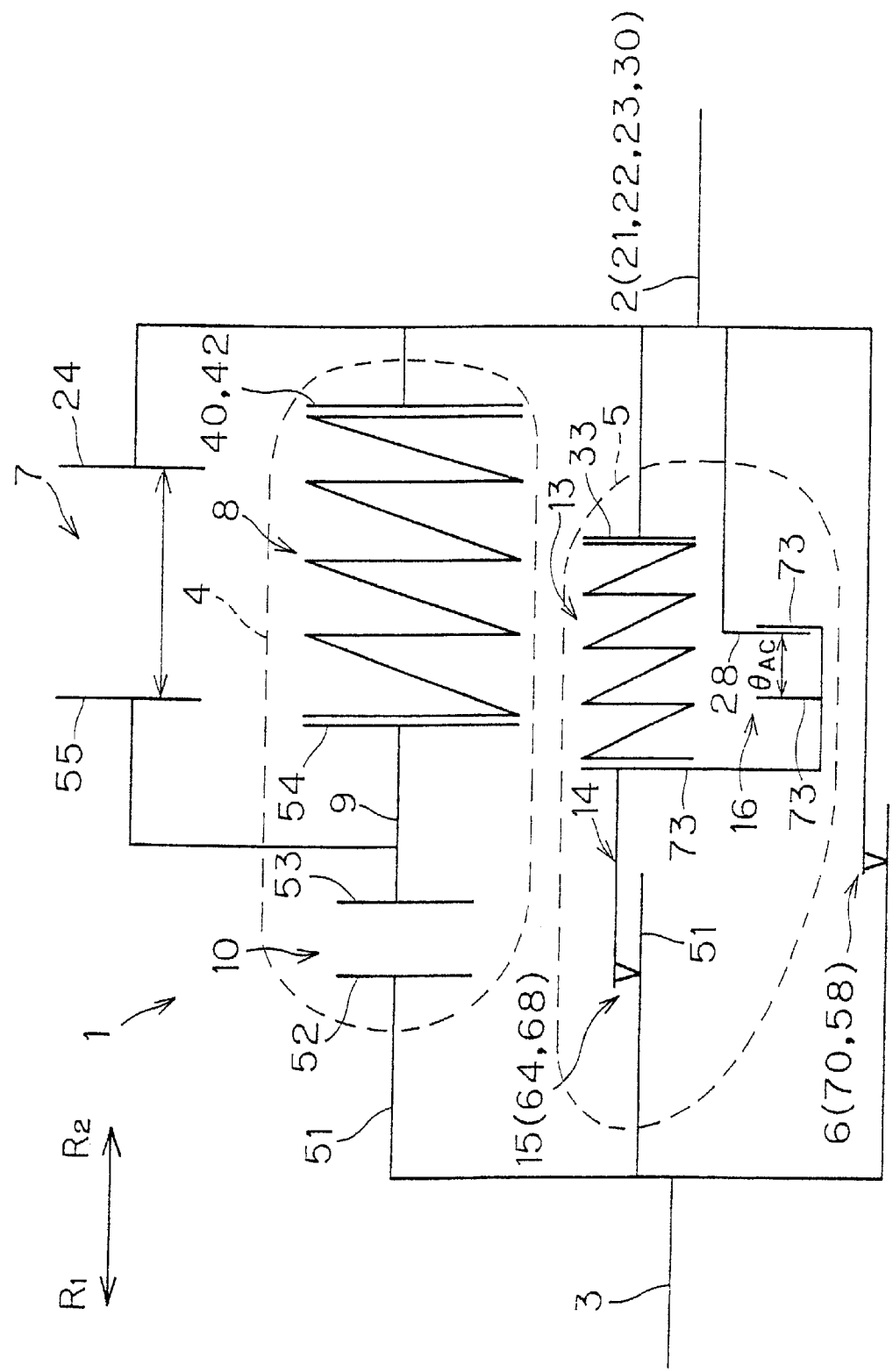
FIG. 8 is a mechanical circuit diagram showing the clutch disk assembly in yet another operating state.

As the various element move toward the point C in FIG. 11, the torsion angle reaches the first torsion angle $\theta 1$, which corresponds to the position of the elements depicted in FIG. 7. At the point C, the first springs 8 are no longer compressed. Now, the output rotary member 3 can rotate relatively to the input rotary member 2, the hub flange 9 and the intermediate plate 14. As a result, characteristics of zero rigidity and a high hysteresis torque are produced.

At a point D in FIG. 11, where relative rotary displacement between input and output members 2 and 3 is less than the first torsion angle $\theta 1$ (shown in FIG. 8), the rotation direction of the output rotary member 3 with respect to the input rotary member 2 is now reversed. Thus, the output rotary member 3 is displaced in a negative direction with respect to the input rotary member 2.

In the angular displacement range from the reversing of the relative rotation to the torsion angle of $\theta AC$, the second spring 13 is compressed, and slide occurs in the low hysteresis torque generating mechanism 6. However, no slide occurs in the high hysteresis torque generating mechanism 15.

Figure 9:
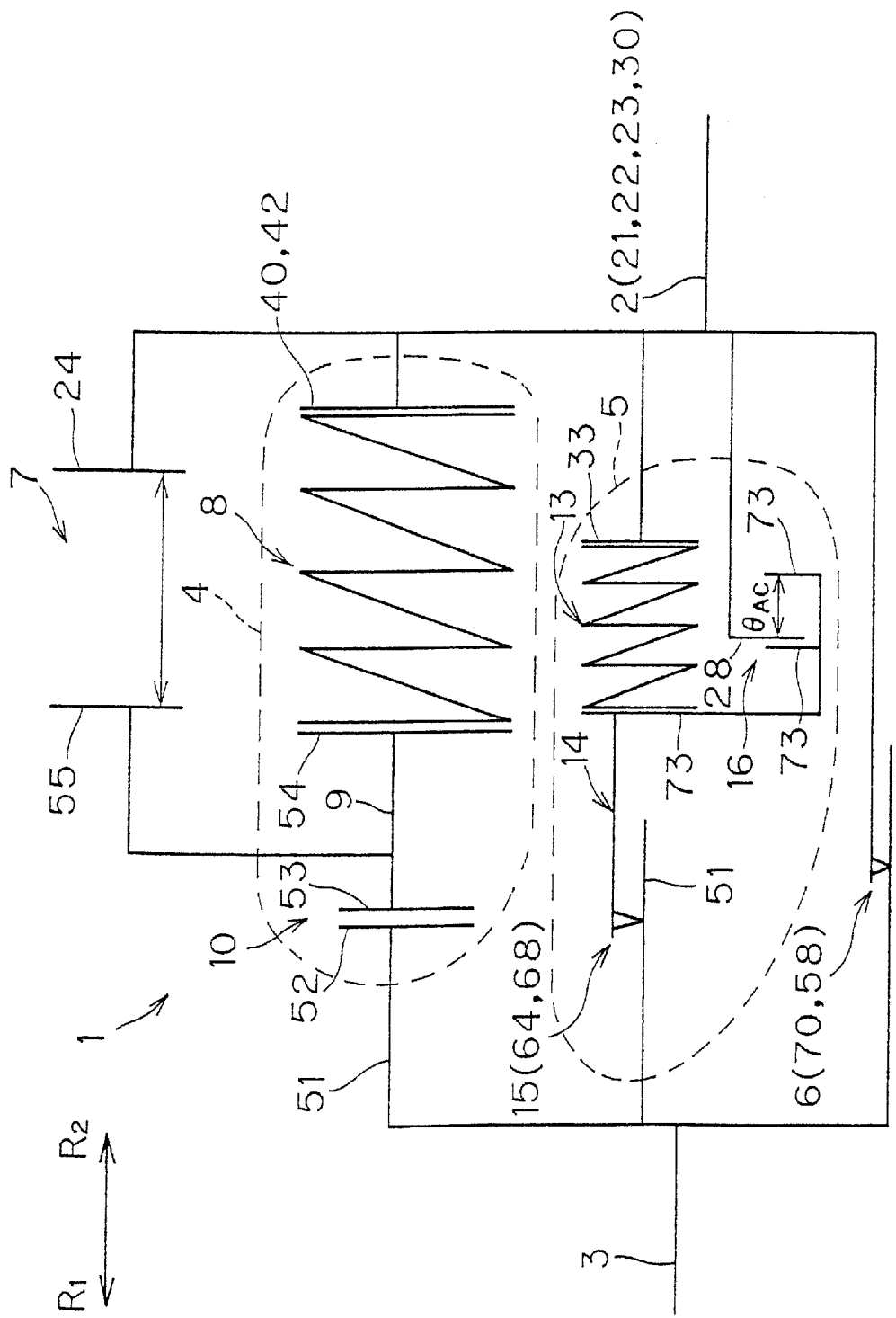
FIG. 9 is a mechanical circuit diagram showing the clutch disk assembly in still another operating state.

At a point E in FIG. 11, contact occurs in the third stop 16, as shown in FIG. 9. Thereafter, the second springs 13 are no longer compressed, and slide occurs in the high hysteresis torque generating mechanism 15. Accordingly, the characteristics of a zero rigidity and a high hysteresis torque are produced.

Figure 10:
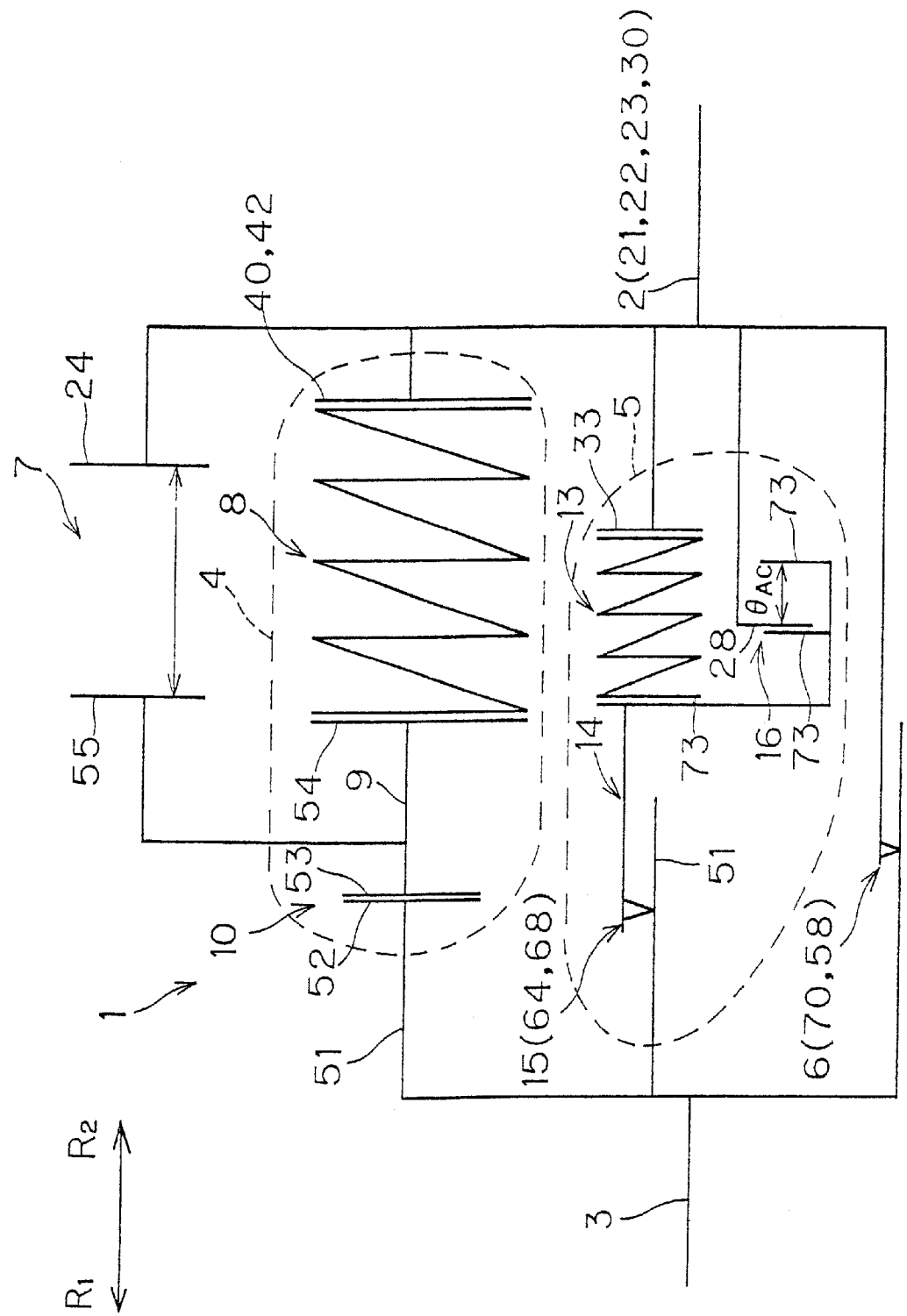
FIG. 10 is a mechanical circuit diagram showing the clutch disk assembly in another operating state.

At a point F in FIG. 11, corresponding to FIG. 10, where displacement between input and output rotary members 2 and 3 is equal to the first torsion angle $\theta 1$, contact occurs in the second stop 10. Thereafter, the first springs 8 are compressed. As a result, characteristics of a high rigidity and a high hysteresis torque are produced.

A torsion characteristic diagram of FIG. 12 shows the overall characteristics experienced when the input and output rotary members 2 and 3 of clutch disk assembly 1 undergoes relative rotation between a maximum positive torsion angle $\theta 4$ and the maximum negative torsion angle $\theta 4$. As can be seen from FIG. 12 that high hysteresis torque appears on both the first and second stages when the torsion occurs through the positive and negative first stages and the positive and negative second stages. Accordingly, low frequency vibrations applied to the clutch disk assembly 1 can be damped rapidly.

The high hysteresis torque is generated in the first stage of relative rotary displacement. This is possible because the first damper mechanism 4 includes the relative rotary displacement within the first torsion angle $\theta 1$ and operates in series with the first spring 18, which has a large spring constant, and the high hysteresis torque generating mechanism 15 operates in the same range.

If minute torsional vibrations caused by combustion variations of the engine are transmitted to the clutch disk assembly 1 during, e.g., normal driving (i.e., while the torsion angle between the output and input rotary members 3 and 2 is in the positive second range between the torsion angle θ1 and torsion angle θ3). The output rotary member 3, intermediate plate 14 and hub flange 9 rotate together with respect to the input rotary member 2, e.g., from the position shown in FIG. 5 (in some circumstances, the second springs 13 may have already returned the engagement portions 28 to the neutral position with respect to the projections 73, corresponding to the point G in FIGS. 11 and 12). In this operation, the first and second springs 8 and 13 operate in parallel, and slide occurs in the low hysteresis torque generating mechanism 6. As a result, characteristics of a high rigidity and a low hysteresis torque are produced. This operation is possible in the range of the torsion angle θAC, i.e., the range where contact occurs on the circumferentially opposite sides in the third stop 16. The first springs 8 act on the output rotary member 3, but the intermediate plate 14 does not engage with the input rotary member 2 in the range of the torsion angle θAC so that no sliding occurs in the high hysteresis torque generating mechanism 15.

A similar operation occurs in the negative second stage corresponding to the point H in FIG. 12.

Description is now provided on an operation in the case where minute vibrations such as idling vibrations are supplied to the clutch disk assembly 1. In this case, the damper mechanism operates in the range of the positive and negative stages corresponding to first torsion angle θ1 and a first torsion angle −θ1. When the minute vibrations are supplied to the structure, e.g., in the state shown in FIG. 4, the output rotary member 3 and the intermediate plate 14 rotate together with respect to the input rotary member 2. In this operation, the second springs 13 act, and slide occurs in the low hysteresis torque generating mechanism 6. As a result, the characteristics of a low rigidity and a low hysteresis torque are produced. The operation torsion angle is in a range defined by the torsion angle θAC, i.e., a range before the contact occurs in the third stop 16 (depicted in FIG. 12 as the point I).

It should be understood that the space or range defined by the torsion angle θAC in the third stop 16 is arranged in series with the high hysteresis torque generating mechanism 15, and functions to prevent the high hysteresis torque generating mechanism 15 from operating in response to the minute vibrations in both the first and second stages of the torsion characteristics (first and second stages corresponding to angular displacement in torsion angles θ1 and θAC, respectively).

When the minute vibrations are idling vibrations or the like which cause displacement within first stages of positive and negative torsion angles +θ1 and −θ1, respectively, a high hysteresis torque is produced in the regions corresponding to regions between points E and F in FIG. 11, where the torsion angle is greater that the torsion angle θAC. Therefore, the high hysteresis torques or friction sliding can occur in the high hysteresis torque generating mechanism 15 when minute vibrations are transmitted to the input rotary member 2. Thereby, a so-called jumping phenomenon which may be caused by the idling vibrations is unlikely to occur.

Second Embodiment

Figure 13:
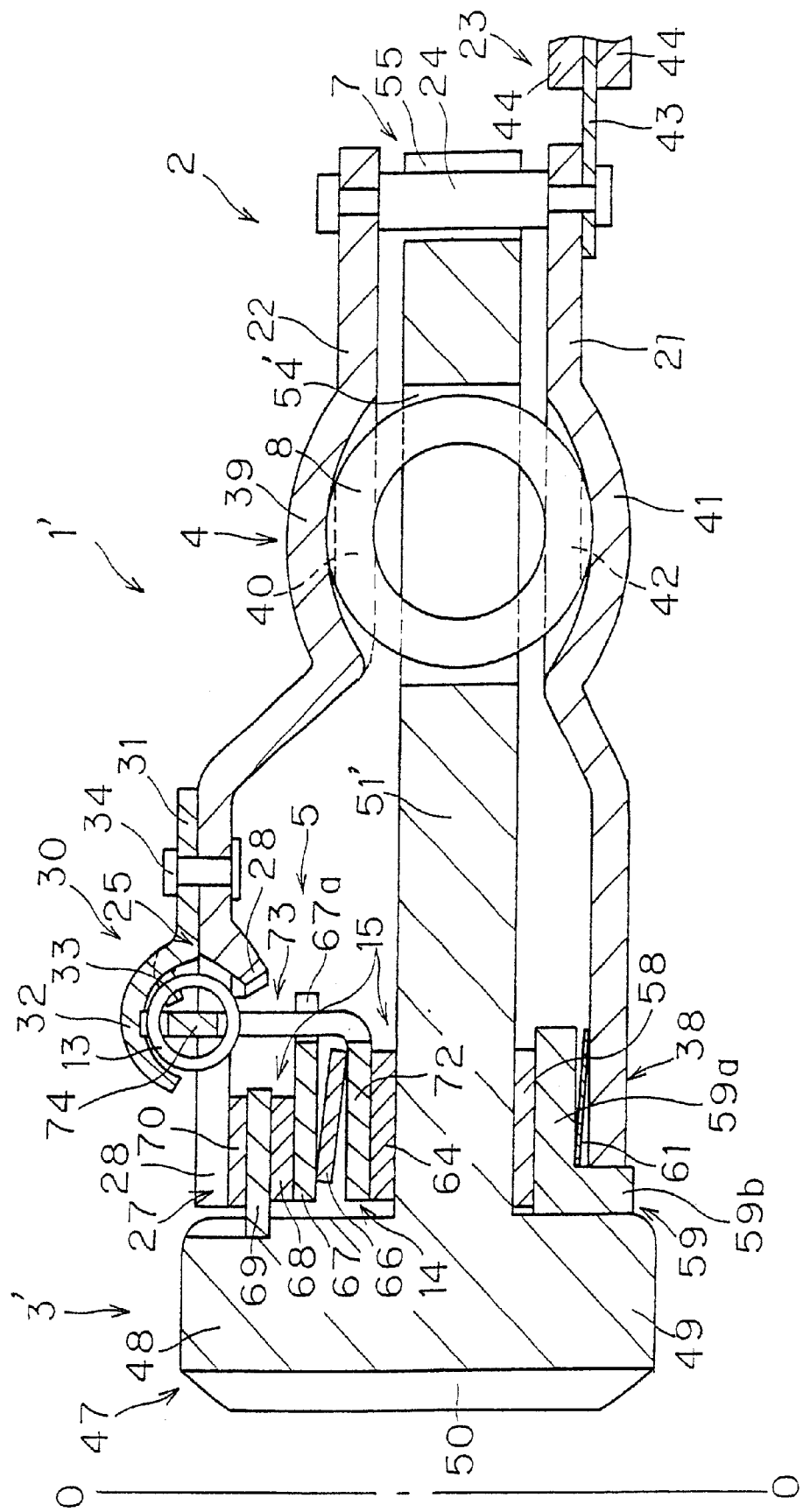
FIG. 13 is a fragmentary cross section of a clutch disk assembly in accordance with a second embodiment of the present invention.
Figure 13A:
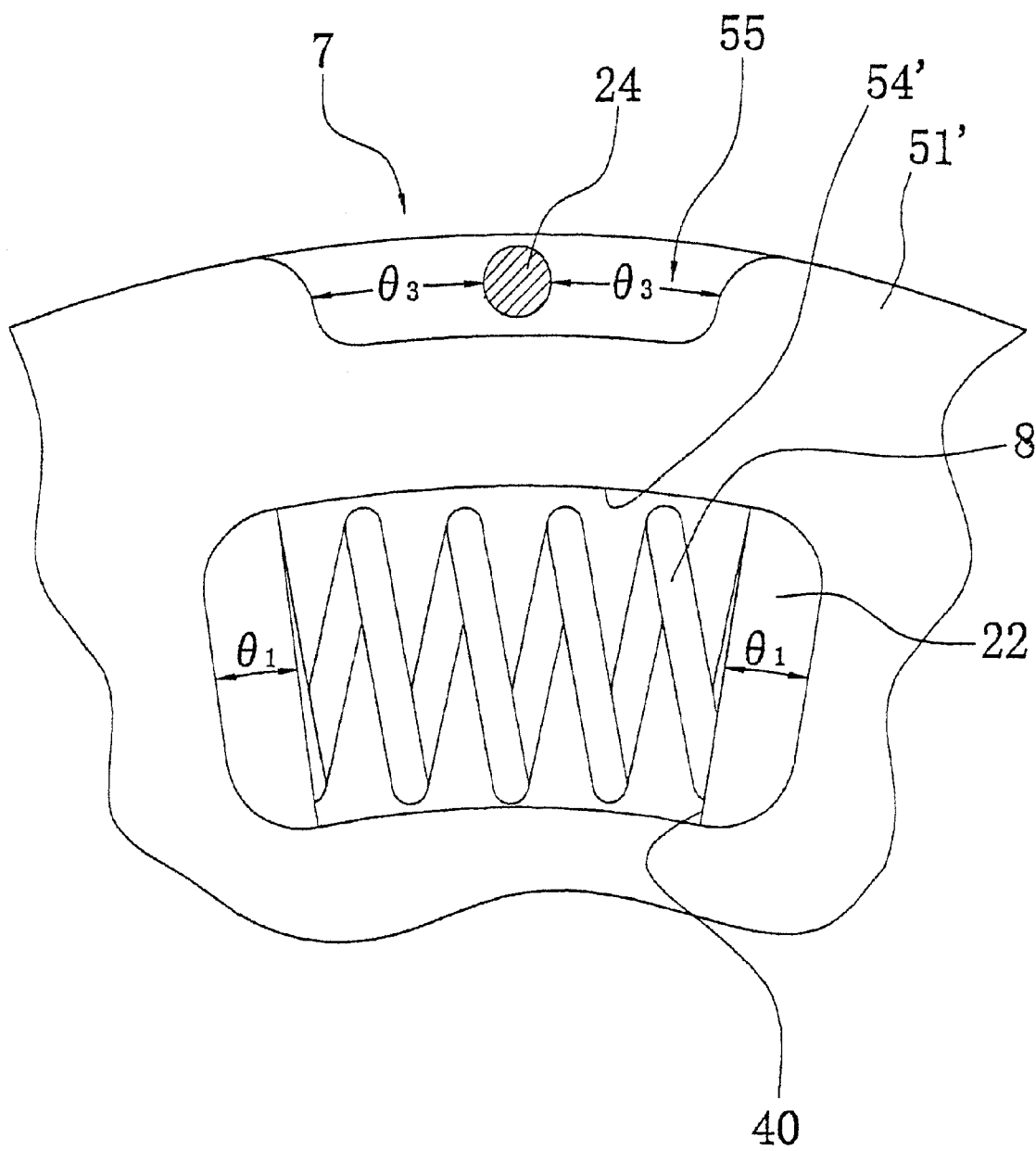
FIG. 13A is a fragmentary, part cross section of a portion of the clutch disk depicted in FIG. 13.

The clutch disk assembly 1' shown in FIG. 13 has the substantially same structure as the clutch disk assembly 1 of the first embodiment. The following description therefore only points out the differences between the first and second embodiments. The clutch disk assembly 1' has an output rotary member 3' that includes an integral flange 51, and does not include the hub flange 9. A space corresponding to the first torsion angle θ1 is defined between each first spring 8 and each of the circumferentially opposite ends of the corresponding window 54', as shown in FIG. 13A. Additional space corresponding to the first torsion angle θ1 is provided on either side of the first spring 8 preventing compression of the first spring 8 until the torsion angle reaches the first torsion angle θ1.

As can be seen from a mechanical circuit diagram of FIG. 14, the first damper mechanism 4 is basically formed of the first springs 8 and the spaces of the first torsion angle θ1. Thus, the first damper mechanism 4 has a structure in which compression of the first springs 8 does not start until the torsion angle reaches the first torsion angle θ1.

The spaces corresponding to the first torsion angle θ1 may be formed between the first springs 8 and the contact portions 40 and 42 of the plates 21 and 22.

Other Embodiments

Figure 3:
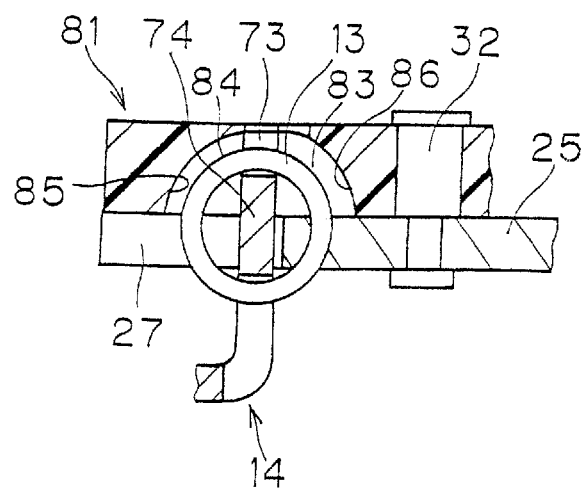
FIG. 3 is a fragmentary cross section of a portion of a clutch disk assembly in accordance with an alternate configuration of the first embodiment of the present invention.

A support member or retaining member 81 shown in FIG. 3 is a member having a function similar to the support member 30 of the foregoing embodiments. In this alternate embodiment, the support member 81 is made of resin. The support member 81 is attached to the inner peripheral portion 25 of the first plate from the axial transmission side. The radially outer portion of the support member 81 is fixed to the inner peripheral portion 25 of the retaining plate by a rivet 32. The support member 81 is provided with a concavity 83 accommodating the second spring 13. The concavity 83 provides a structure for supporting the radially opposite sides and the axially outer side of the second spring 13. Contact portions 84 formed on the circumferentially opposite sides of the concavity 83 are in contact with the circumferentially opposite ends of the second spring 13, respectively. Radially inner and outer portions 85 and 86 of the concavity 83 support the radially opposite sides of the second spring 13, respectively.

The above described structure, wherein the support member 81 made of resin is fixed to the axially one side of the retaining plate, can provide the spring support member in the retaining plate. This structure requires neither the support member of the form in the foregoing embodiment nor complicated working and machining of the inner peripheral portion 25 of the retaining plate. This simple structure can be achieved owing to the fact that the second spring 13 is not arranged near the flange of the hub but is arranged axially outside the flange. In particular, it is owing to the fact that the second spring 13 is exposed outward from the plate on the input side, and more specifically is arranged in the recess 27 of the plate on the input side.

According to the damper mechanism of the invention, the friction mechanism operates to generate the high hysteresis torque in the region of the first stage. Therefore, low frequency vibrations such as tip-in/tip-out can be effectively damped. When minute vibrations of small amplitudes are transmitted in the first and second stages, no slide occurs in the friction mechanism so that the characteristics of a low hysteresis torque can be achieved.

What is claimed is:

1. A damper assembly comprising:
 a first rotary member having an outer input portion;
 a second rotary member having an inner output portion located radially inward of said outer input portion of said first rotary member, said second rotary member being disposed adjacent to said first rotary member for limited relative rotary displacement with respect to one another about a central rotary axis, the limited relative rotary displacement being defined by a primary torsion angle, and within the limited relative rotary displacement a first stage of relative rotary displacement being defined by a first torsion angle that is smaller than the primary torsion angle;

a first damper mechanism provided to couple circumferentially and elastically said first and second rotary members together, and including a first elastic member arranged between said first and second rotary members configured to transmit torque therebetween such that said first elastic member is not compressed in response to relative rotary displacement within the first torsion angle; and a second damper mechanism disposed adjacent to said first and second rotary members to operate in parallel with said first damper mechanism such that the total rigidity of said damper assembly is substantially equal to the sum of rigidities of said first damper mechanism and said second damper mechanism to couple circumferentially and elastically said first and second rotary members together, said second damper mechanism including a first intermediate member operatively disposed between said first and second rotary members configured to rotate relative to said first rotary member within a second torsion angle that is smaller than the first torsion angle, a second elastic member arranged between said first intermediate member and said first rotary member configured to couple circumferentially and elastically said first intermediate member and said first rotary member together, said second elastic member having a lower rigidity than said first elastic member, said second elastic member being compressed circumferentially in response to relative rotation between said first intermediate member and said first rotary member, and a friction mechanism provided between said first intermediate member and said second rotary member configured to create friction in response to relative rotation between said first intermediate member and said second rotary member.

2. A damper mechanism comprising:

a first rotary member;

a second rotary member disposed adjacent to said first rotary member for limited relative rotary displacement with respect to one another about a central rotary axis, the limited relative rotary displacement being defined by a primary torsion angle, and within the limited relative rotary displacement a first stage of relative rotary displacement being defined by a first torsion angle that is smaller than the primary torsion angle;

a first damper mechanism provided for circumferentially and elastically coupling said first and second rotary members together, and including a first elastic member arranged between said first and second rotary members for transmitting torque therebetween such that said first elastic member is not compressed in response to relative rotary displacement within the first torsion angle; and a second damper mechanism disposed adjacent to said first and second rotary members for operation in parallel with said first damper mechanism for circumferentially and elastically coupling said first and second rotary members together, said second damper mechanism including a first intermediate member operatively disposed between said first and second rotary members for rotating relative to said first rotary member within a second torsion angle that is smaller than the first torsion angle, a second elastic member arranged between said first intermediate member and said first rotary member for circumferentially and elastically coupling said first intermediate member and said first rotary member together, said second elastic member having a lower rigidity than said first elastic member, said second elastic member being compressed circumferentially in response to relative rotation between said first intermediate member and said first rotary member, and a friction mechanism provided between said first intermediate member and said second rotary member for creating friction in response to relative rotation between said first intermediate member and said second rotary member, said first and second rotary members being formed with corresponding windows, said first elastic member being disposed in said windows, said window in said second rotary member having a circumferential length greater than a circumferential length in said window in said first rotary member, the first torsion angle being defined by the difference in circumferential length in said windows in said first and second rotary members.

3. A damper mechanism comprising:

a first rotary member;

a second rotary member disposed adjacent to said first rotary member for limited relative rotary displacement with respect to one another about a central rotary axis, the limited relative rotary displacement being defined by a primary torsion angle, and within the limited relative rotary displacement a first stage of relative rotary displacement being defined by a first torsion angle that is smaller than the primary torsion angle;

a first damper mechanism provided for circumferentially and elastically coupling said first and second rotary members together, and including a first elastic member arranged between said first and second rotary members for transmitting torque therebetween such that said first elastic member is not compressed in response to relative rotary displacement within the first torsion angle; and a second damper mechanism disposed adjacent to said first and second rotary members for operation in parallel with said first damper mechanism for circumferentially and elastically coupling said first and second rotary members together, said second damper mechanism including a first intermediate member operatively disposed between said first and second rotary members for rotating relative to said first rotary member within a second torsion angle that is smaller than the first torsion angle, a second elastic member arranged between said first intermediate member and said first rotary member for circumferentially and elastically coupling said first intermediate member and said first rotary member together, said second elastic member having a lower rigidity than said first elastic member, said second elastic member being compressed circumferentially in response to relative rotation between said first intermediate member and said first rotary member, and a friction mechanism provided between said first intermediate member and said second rotary member for creating friction in response to relative rotation between said first intermediate member and said second rotary member, said second rotary member including a hub formed with a hub flange and a flange disposed about said hub flange, said hub flange being formed with gear teeth on a radial outer surface thereof, said flange being formed with gear teeth on a radially inner surface circumferentially spaced apart from said gear teeth on said hub flange thereby defining the first torsion angle.

4. The damper mechanism according to claim 3, wherein a portion of said first rotary member defines an annular space between said portion of said first rotary member and said hub flange, said friction mechanism, said second elastic member and said first intermediate member being at least partially disposed in said annular space.

5. The damper mechanism according to claim 4, wherein said second damper mechanism provides vibration dampening throughout all of the limited relative rotary displacement between said first and second rotary members defined within the primary torsion angle.

6. The damper mechanism according to claim 5, wherein said first rotary member is at least partially defined by a pair of plates, a first of said plates being formed with said portion for defining said annular space.

7. The damper mechanism according to claim 6, wherein said friction mechanism further comprises a friction washer disposed between a second of said pair of plates and said hub flange for creating friction in response to relative rotation therebetween.

8. The damper mechanism according to claim 7, wherein said friction mechanism further comprises a friction washer disposed between said first of said pair of plates and said first intermediate member for creating friction in response to relative rotation therebetween.

9. The damper mechanism according to claim 8, wherein said friction mechanism further comprises a friction washer disposed between said hub and said first intermediate member for creating friction in response to relative rotation therebetween.

10. The damper mechanism according to claim 9, wherein said second elastic member is retained by said first of said pair of plates.

11. The damper mechanism according to claim 9, wherein said second elastic member is retained by a retaining member fixed to said first of said pair of plates.

12. The damper mechanism according to claim 11, wherein said retaining member is made of a resin material.

* * * * *